(12) United States Patent
Kano et al.

(10) Patent No.: US 7,862,104 B2
(45) Date of Patent: Jan. 4, 2011

(54) IMPACK ABSORBING MEMBER FOR VEHICLE

(75) Inventors: Mitsutoshi Kano, Toyota (JP); Makoto Nakanishi, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 94 days.

(21) Appl. No.: 11/503,996

(22) Filed: Aug. 15, 2006

(65) Prior Publication Data

US 2008/0012386 A1  Jan. 17, 2008

(30) Foreign Application Priority Data

Jul. 11, 2006  (JP) .............................. 2006-190967

(51) Int. Cl.
*B60R 19/18* (2006.01)

(52) U.S. Cl. ................................ 296/187.03

(58) Field of Classification Search ............ 296/187.03, 296/187.09; 293/102, 132, 133, 154, 155
See application file for complete search history.

(56) References Cited

U.S. PATENT DOCUMENTS

| 5,803,514 | A  | * | 9/1998 | Shibuya et al. ............... 293/133 |
| 6,729,429 | B2 | * | 5/2004 | Takahashi ................... 180/271 |
| 2008/0030031 | A1 | * | 2/2008 | Nilsson ....................... 293/133 |
| 2008/0054655 | A1 | * | 3/2008 | Kizaki et al. ................. 293/133 |
| 2008/0054656 | A1 | * | 3/2008 | Guiles et al. ................. 293/155 |
| 2008/0106107 | A1 | * | 5/2008 | Tan et al. ..................... 293/133 |

FOREIGN PATENT DOCUMENTS

| EP | 1 580 079 | 9/2005 |
| EP | 1 640 224 | 3/2006 |
| JP | 02 160170 | 6/1990 |
| JP | 10-244955 | 9/1998 |
| JP | 2002-104107 | 4/2002 |
| JP | 2002-302063 | 10/2002 |
| JP | 2003 285162 | 10/2003 |
| JP | 2005-152920 | 6/2005 |
| JP | 2005-162049 | 6/2005 |
| JP | 2005-233263 | 9/2005 |
| JP | 2006-123887 | 5/2006 |
| WO | WO 2005/120903 | 12/2005 |

* cited by examiner

*Primary Examiner*—H Gutman
(74) *Attorney, Agent, or Firm*—Finnegan, Henderson, Farabow, Garrett & Dunner, LLP.

(57) ABSTRACT

The present invention relates to an impact absorbing member (14L, 14R) for vehicle which has a hollow cylindrical shape and is disposed in a vehicle between a side member (12L, 12R) and a bumper beam (10), and which is axially crushed along an axis of the impact absorbing member by receiving a compressive force into a bellows shape to absorb an impact energy upon deformation, wherein (a) the impact absorbing member includes a main body (20; 80; 90) of a hollow cylindrical shape, and a pair of attaching plates (54, 56) to which both axial ends of the main body are fixedly welded respectively; (b) the main body has, at least one axial end thereof, a flange (68, 70) protruding at least axially and being integrally formed with the main body; (c) the attaching plate has an adhered supporting portion (76) formed in parallel to the flange to be surface contacted therewith; and (d) the main body is fixedly welded to the attaching plate with the flange being surface contacted with the adhered supporting portion.

12 Claims, 7 Drawing Sheets

US 7,862,104 B2

IMPACK ABSORBING MEMBER FOR VEHICLE

The present application is based on Japanese Patent Application No. 2006-190967 filed on Jul. 11, 2006, the content of which is incorporated herein by reference.

BACKGROUND OF THE INVENTION

1. Field of the Invention

The present invention relates to an impact absorbing member for vehicle. In particular, it relates to the impact absorbing member which can be suitably fixedly welded to an attaching plate even when thickness of a main body thereof is thin, and which is light-weight and low-price.

2. Description of Related Art

An impact absorbing member for vehicle having a hollow cylindrical shape and being disposed between a side member and a bumper beam of a vehicle has been widely known (refer to Japanese Application Laid-open No. 10-244955, and Japanese Patent Application Laid-open No. 2002-104107). It crushes, receiving a compressive load, axially into a bellows shape to absorb an impact energy.

FIG. 6 is a set of views explaining one example of such the impact absorbing member for vehicle. FIG. 6A is a schematic plan view in which a front bumper beam 10 and members therearound of the vehicle are viewed from an upper part. At front ends of the right and left side members 12R, 12L, crush boxes 14R, 14L are disposed as the impact absorbing member, and the bumper beam 10 is, at right and left ends thereof, attached to the side members 12R, 12L via the crush boxes 14R, 14L.

As shown in FIG. 6B which is a sectional view taken along a line 6B-6B in FIG. 6A, that is the sectional view in the vicinity of the right attaching portion, the crush box 14R includes a main body 20 and a pair of attaching plates 22, 24 welded thereto. In detail, the main body 20 has a hollow cylindrical shape such as an octagonal sectional shape. Each of the attaching plates 22, 24 is fixedly welded to each of axial ends of the main body 20 integral therewith. The crush box 14R is, at both axial ends thereof, fixed to the side member 12R and the bumper beam 10 via the attaching plates 22, 24 with bolts (not shown).

When the crush boxes 14R and 14L receive a compressive load F by an impact applied from a front part of the vehicle, as shown in FIG. 6C, the main body 20 crushes or deforms axially into the bellows shape. Upon deformation, the main body 20 absorbs an impact energy to thereby buffer the impact applied to structural members of the vehicle such as the side member 12R. Here, the crush or deformation into the bellows shape is a phenomenon that the main body 20 is subjected to a buckling at plural points (L-shape minute folds shown in FIG. 6C). Normally, the buckling begins from the axial end of the crush box 14R which comes close to the bumper beam 16, that is a load inputting side thereof, and progresses toward a vehicle body as lapse of time.

Incidentally, the bumper beam 10 is right-and-left symmetrical, and a left attaching portion is constructed in the same manner as the right attaching portion. Also, the bumper beam 10 functions as a reinforcement and an attaching member for the bumper, and to the bumper beam 10 a bumper main body 16 made of synthetic resin and the like is attached integrally.

FIGS. 7A to 7C are views for explaining some modes of a fixedly welded portion between the above main body 20 and one of the attaching plates 22, 24 (FIG. 7 shows the attaching plate 22). In each of FIG. 7A, FIG. 7B and FIG. 7C, an upper view is a perspective view, and a lower view is a sectional view of the fixedly welded portion.

Among them, FIG. 7A shows a case where an axial end of the main body 20 is butted to the attaching plate 22, and a L-shaped bracket 30 is spot-welded to both the main body 20 and the attaching plate 22 to join them each other. FIG. 7B shows a case where an axial end of the main body 20 is bent outwardly in a right angle to form a flange 32 integrally to be fixed to the attaching plate 22 by a spot-welding. FIG. 7C shows a case where an axial end of the main body 20 is butted to the attaching plate 22 in a right angle to be fixed by an arc-welding to the attaching plate 22 integrally.

However, the above case of FIG. 7A requires to prepare the bracket 30 separately and to weld it to the attaching plate 22. As a result, the number of parts increases to cause high-price and heavy-weight. In the case of FIG. 7B, upon application of the compressive load, bending of the flange 32 results in bending of the main body 20 to deteriorate the impact absorbing ability thereof.

On the other hand, in the case of FIG. 7C where the arc-welding is performed with the axial end of the main body 20 being butted to the attaching plate 22, unnecessity of the bracket and the like enables the main body 20 to be constructed in light -weight and low-price, and to exhibit a desired impact energy absorbing ability stably. However, when thickness of the main body 20 is thin, following drawbacks may be caused. That is, the main body 20 of thin thickness may be melted to form a hole thereon, or may be thinned to lower the strength thereof, upon the welding. To avoid such drawback, the main body 20 is required to have the thickness of about 1.4 mm or more.

For satisfying the above requirement, it is conceivable to thin the main body 20, with maintaining the desired impact energy absorbing ability by contriving a shape thereof and the like. Also conceivable is thinning the main body 20 for purpose of absorbing the impact energy by a small load. The small load is applied for example by the impact in a low vehicle speed of about 15 km/h or less, and the main body 20 deforms to decrease a damage of the vehicle. However, the main body 20 is fixedly welded to the attaching member 22 by the arc-welding with the axial end thereof being butted to the attaching member 22, similar to the above-mentioned case, so that there was a problem that the thickness of the main body 20 can be hardly thinned below 1.4 mm.

The present invention is made in view of the above-mentioned circumstances. It is therefore an object of the present invention to provide an impact absorbing member for vehicle, which can realize a desired impact energy absorbing ability, and which is light-weight and low-price, by fixedly arc-welding the main body to the attaching plate suitably even when thickness thereof is thinner than 1.4 mm.

SUMMARY OF THE INVENTION

For achieving the above purpose, the present invention relates to an impact absorbing member for vehicle which has a hollow polygonal shape and is disposed in a vehicle between a side member and a bumper beam, and which is axially crushed by receiving a compressive force into a bellows shape to absorb an impact energy upon deformation, wherein (a) the impact absorbing member includes a main body of a hollow polygonal shape, and a pair of attaching plates to which both axial ends of the main body are fixedly welded respectively, (b) the main body has, at least one axial end thereof, a flange protruding at least axially and being integrally formed therewith, (c) the attaching plate has a adhered supporting portion, formed in parallel to the flange to be surface contacted therewith, (d) the main body is fixedly welded to the attaching plate with the flange being surface contacted with the adhered supporting portion.

In the above impact absorbing member for vehicle, at the axial end of the main body of the hollow polygonal shape, the flange is formed integrally therewith to protrude at least axially, and is fixedly welded to the attaching plate integrally with the axial end thereof being surface contacted with the adhered supporting portion of the attaching plate.

For this reason, compared with the above-mentioned case shown in FIG. 7C where the axial end of the main body is welded to the attaching plate with being butted thereto in the right angle, following advantages can be obtained. That is, even when the impact absorbing member is thin in the main body thereof, it can be fixedly welded to the attaching member suitably. In addition, the impact absorbing member realizing the desired impact energy absorbing ability can be constructed in light-weight and low-price on account of unnecessity of the bracket and the like.

The thinnable main body can bring following two advantages. The first advantage is, in the case where the sectional shape is contrived to thin the main body with maintaining the impact energy absorbing ability, the main body is thinned below 1.4 mm to achieve further light-weight. The second advantage is, in the case where the main body is thinned for the purpose of absorbing the impact energy under low load upon a collision in the low vehicle speed to decrease a vehicle damage, the main body is thinned below 1.4 mm to be crushed with low load, thereby obtaining the impact energy absorbing operation.

Here, an expression that the flange "protruding at least axially" means the protruding direction of the flange has an axial component, and does not exclude having a radial component. When the protruding direction of the flange has both the axial component and the radial component, the flange makes, as it protrudes radially outwardly or radially inwardly, a predetermined angle $\alpha$ relative to the main body of hollow polygonal shape or an axis thereof.

In the above impact absorbing member for vehicle, the flange protrudes outwardly from the hollow polygonal shape relative to an axis of the main body to make an incline angle $\alpha$ ranging from zero to sixty degrees ($0° \leq \alpha < 60°$).

According to such the structure, since the incline angle of the flange protruded outwardly relative the main body or the axis thereof is selected to be from zero to sixty degrees ($0° \leq \alpha < 60°$), a bending deformation of the main body upon application of the compressive load is prevented more securely, so that the desired impact energy absorbing ability can be obtained stably. This is different from the case shown in FIG. 7B where the flange is formed at the right angle relative to the main body. Noted that the flange can be embodied in various modes, other than the above mode, as will be explained later.

In the above impact absorbing member for vehicle, a fillet-welding is performed along a top periphery of the flange, so that the flange is fixedly welded to the adhered supporting portion integrally.

According to such the structure, the flange is fixedly welded integrally to the adhered supporting portion by performing the fillet-welding along the top periphery of the flange. The fillet welding can be the arc-welding performed easily from an outside of the main body. This is different from the spot welding (resistance welding) in which an overlapped portion between the flange and the adhered supporting portion are fixedly welded. Noted that the welding can be embodied in various modes, other than the above mode, as will be explained later.

In the above impact absorbing member for vehicle, the attaching plate has a swell portion formed by subjecting a part to be positioned inside of the hollow polygonal shape to a drawing to swell toward the main body, and an outer peripheral wall of the swell portion forms the adhered supporting portion.

According to such the structure, the part of the attaching plate positioned inside of the hollow polygonal shape of the main body is swelled toward the main body by the drawing, so that the outer peripheral wall of the swell portion forms the adhered supporting portion. For this reason, the adhered supporting portion has higher rigidity than the adhered supporting portion formed by bending up the cut part of the attaching plate, thereby rendering the excellent supporting strength. Noted that the attaching plate can be embodied in various modes, other than the above mode, as will be explained later.

In the following, other embodying modes of the components constructing the present invention will be explained.

The impact absorbing member for vehicle of the present invention can be applied to both the attaching portion of the bumper beam attached to the vehicle front side and the attaching portion of the bumper beam attached to the vehicle rear side, but it can be applied to only one of them.

As regard a shape of the bumper beam in a longitudinal direction to which the present invention is applied, that is the shape in a plan view of the bumper beam viewed from an upper part, for example the front bumper beam can preferably have a slightly curved shape where a longitudinally central portion thereof is protruded forwardly. However, the front bumper beam can have various modification such as a substantially linear shape, or a shape where only the both longitudinal ends are inclined or bent rearward.

The fixedly welding manner of the present invention can be applied to any one of the fixedly welding portions between the main body and the paired attaching plates, for example to the load inputting side thereof. In this case, for the other fixedly welded portion, the above mentioned fixedly welding and fixing structure shown in FIGS. 7A and 7B can be adopted. However, the both axial ends of the main body are preferably provided with the flanges each projecting axially, and the paired attaching plate are preferably provided with the adhered supporting portion for applying the present invention to the both fixedly welded portions.

The flange is preferably provided on an entire periphery of the main body, but it can be divided into plural flange portions depending on the sectional shape of the main body. For example, only four flange portions are sufficiently provided at right and left portions, as well as upper and lower portions of the main body. Other various modifications can be adopted for the flange.

Within the incline angle $\alpha$ of the flange ranging from zero to sixty degrees ($0° \leq \alpha < 60°$), it is preferable that the incline angle ranges from five to forty degrees ($5° \leq \alpha < 40°$), and the adhered supporting portion is formed by an inclined surface inclined outward of the hollow polygonal shape. Incidentally, upon carrying out the first invention, the flange can be inclined inside of the hollow polygonal shape.

The fillet-welding is performed along the top periphery of the flange to fixedly weld the flange to the adhered supporting portion. However, in addition to such mode, the adhered overlapped portions between the flange and the adhered supporting portion can be fixedly welded by the spot-welding. Further, both the fillet-welding and the spot-welding can be used together. Here, as the fillet-welding the arc-welding is preferably used.

The swell portion swelled toward the main body is provided to form the adhered supporting portion. However, in addition to such mode, an annular concave groove concaved in an opposite direction to the main body can be provided corresponding to the sectional shape of the main body, so that an inner peripheral wall surface is used as the adhered supporting portion. Also, a cut part(s) of the attaching plate can be bent up to form the adhered supporting portion. Other various modification can be adopted for the adhered supporting portion.

The main body preferably satisfies following two conditions. (i) A first condition is that the sectional view perpendicular to the axis of the hollow polygonal shape has a flat polygonal which is more than a hexagon and which includes at least two parallel sides. (ii) A second condition is that a pair of side walls constructing at least two parallel sides in the polygonal sectional view are provided with respectively a concave groove concaved inwardly and extending axially. In any way, the main body can have various sectional shape, such as a square, rectangle, simple polygonal shape more than pentagon with no concave groove, circular, or ellipse.

Provision of the concave grooves and convex projections extending axially about the axis of the hollow polygonal shape with a predetermined pitch, can thin the main body and lighten the weight, with maintaining the desired impact energy absorbing ability. The number and position of the concave grooves and that of the convex projections can be optionally determined, but they are preferably provided symmetrical with respect to the axis (more accurately, with respect to a plane including the axis) of the main body. For suitable crush of the main body into the bellows shape, notches, grooves, projections can be provided with a predetermined pitch in the axial direction, if needed.

In addition, the main body can have a flat octagon in the sectional shape perpendicular to the axis of the hollow polygonal shape, and on a pair of side walls constructing two long sides substantially parallel to a long axis of the sectional shape, concave grooves of the number of two or more are provided symmetrically with respect to the long axis.

Such the main body can be comprised of for example a pair of half pieces divided by a plane including the axis or a plane substantially parallel thereto of the hollow polygonal shape. That is, each of the half pieces of substantially U-shape in the sectional view is formed by pressing a sheet plate and the like, and they are fixedly welded each other integrally with overlapping both side edges at open sides with each other. However, a hollow pipe member of circular shape or square shape can be subjected to a hydraulic forming to form the main body of predetermined sectional view. Other various modifications can be adopted for the main body.

Such the main body can be comprised of for example a pair of half pieces divided by a plane including the axis or a plane substantially parallel thereto of the hollow cylindrical shape. That is, each of the half pieces of substantially U-shape in the sectional view is formed by pressing a sheet plate and the like, and they are fixedly welded each other integrally with overlapping both side edges at open sides with each other. However, a hollow pipe member of circular shape or square shape can be subjected to a hydraulic forming to form the main body of predetermined sectional view. Other various modifications can be adopted for the main body.

The present invention is preferably applied to the main body (the main body constructed by forming a sheet plate (for example, steel plate) is also included) of which thickness is below 1.4 mm. However, even for the main body of which thickness is 1.4 mm or more, the present invention can be applied. As a material for the main body, a rolled steel plate and a carbon steel tube can be preferably used for example, and other various metal plates and pipes can be adopted to render the desired impact energy absorbing operation by the crush into the bellows shape thereof.

BRIEF DESCRIPTION OF THE DRAWINGS

FIG. 1 is a set of views explaining the impact absorbing member for vehicle according to one embodiment of the present invention, in which

FIG. 4 is a set of graphs showing tested results for examining the impact energy absorbing ability of plural kinds of the impact absorbing members for vehicle which are different in the inclined angle in FIG. 1, in which

FIG. 6 shows a set of view showing the impact absorbing member for vehicle, in which

DETAILED DESCRIPTION OF THE PREFERRED EMBODIMENT

Hereinafter, an embodiment of the present invention will be explained in detail with reference to attached drawings.

Figure 6A:
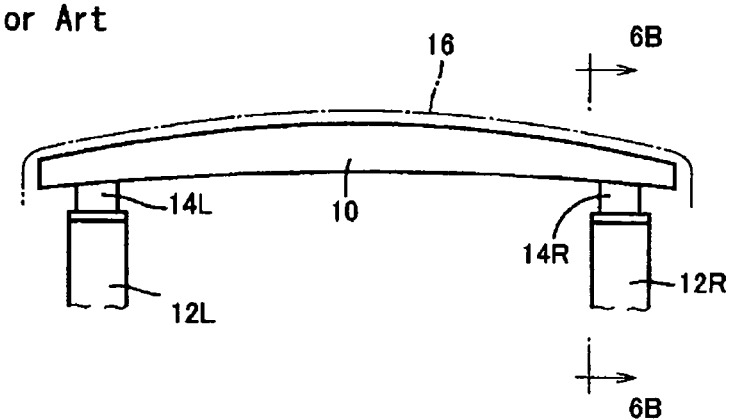
FIG. 6A is a schematic plan view showing one example of concrete disposing manner.
Figure 6B:
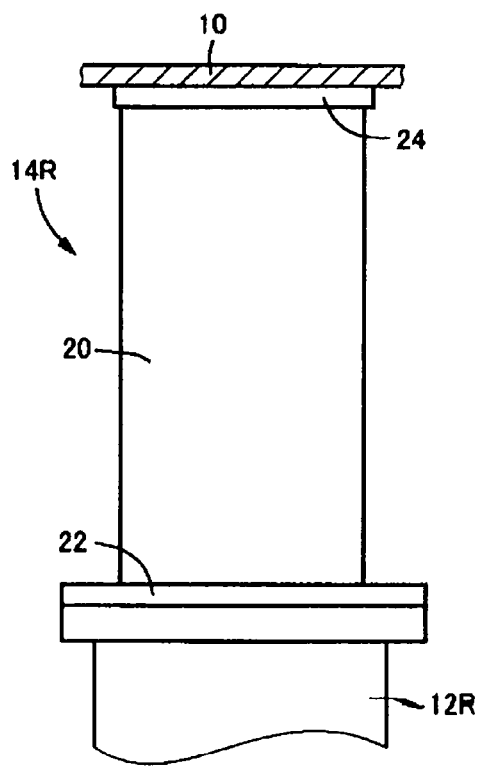
FIG. 6B is a sectional view taken along a 6B-6B line in FIG. 6A.

A crush box 50 shown in FIG. 1 is disposed between the side member 12R and the bumper beam 10 to be used instead of the crush box 14R shown in FIG. 6, and corresponds to the claimed impact absorbing member for vehicle. This crush box 50 includes a main body 52 of hollow polygonal shape 100 and a pair of attaching plates 54, 56 fixedly welded respectively to both axial ends of the main body 52 integrally. The crush box 50 is disposed between the side member 12R and the bumper beam 10 in a posture where an axis of the main body 52 is substantially parallel to a front-and-rear direction of the vehicle, and fixed integrally to the side member 12R and the bumper beam 10 via attaching plates 54, 56 by bolts and the like (not shown).

Figure 6C:
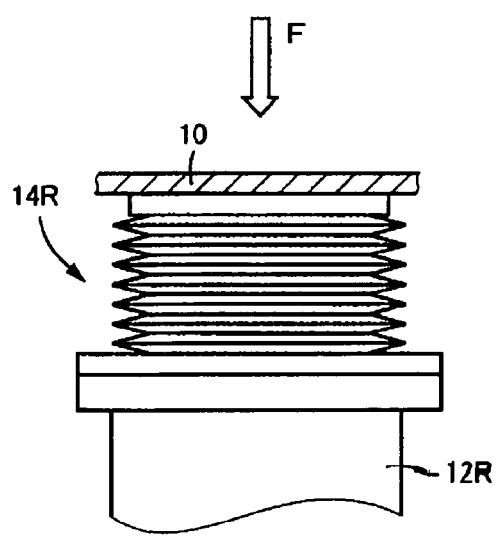
FIG. 6C is a view showing the crushed state of the crush box by the compressive load F.

The crush box 50, when receiving the compressive load from the vehicle front side resulting from the impact, crushes axially into the bellows shape in the same manner as the above-mentioned crush box 14R shown in FIG. 6C. During the deformation, the crush box 50 absorbs the impact energy to buffer the impact applied to structural members such as the side member 12R and the like of the vehicle.

Figure 1A:
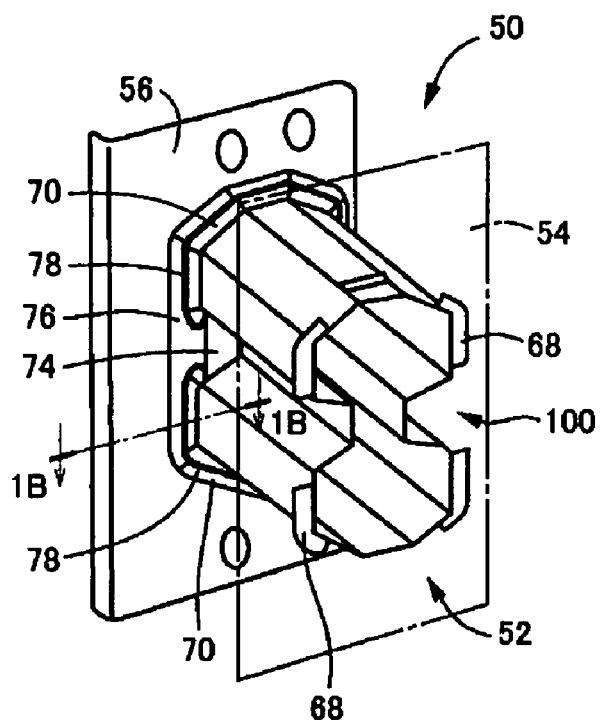
FIG. 1A is a perspective view with this side attaching plate being omitted.
Figure 1B:
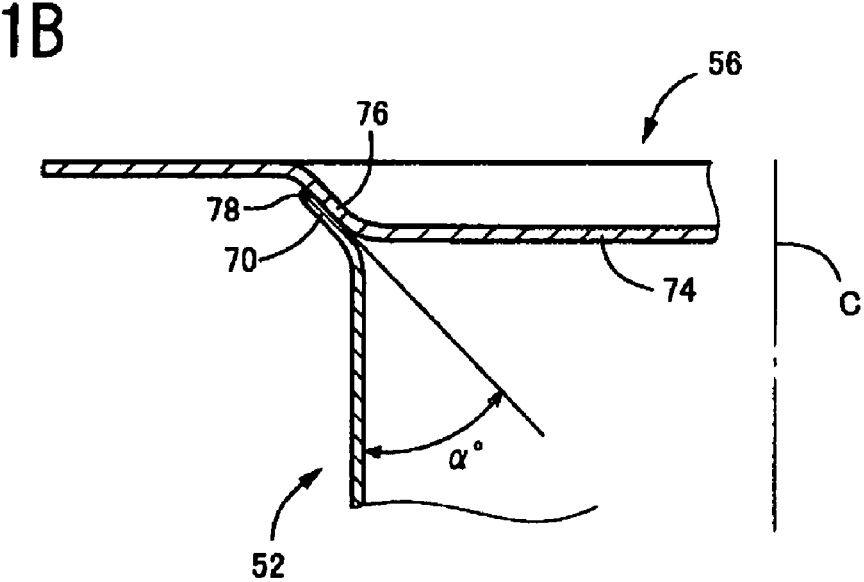
FIG. 1B is a sectional view taken along a line 1B-1B in FIG. 1A.
Figure 2:
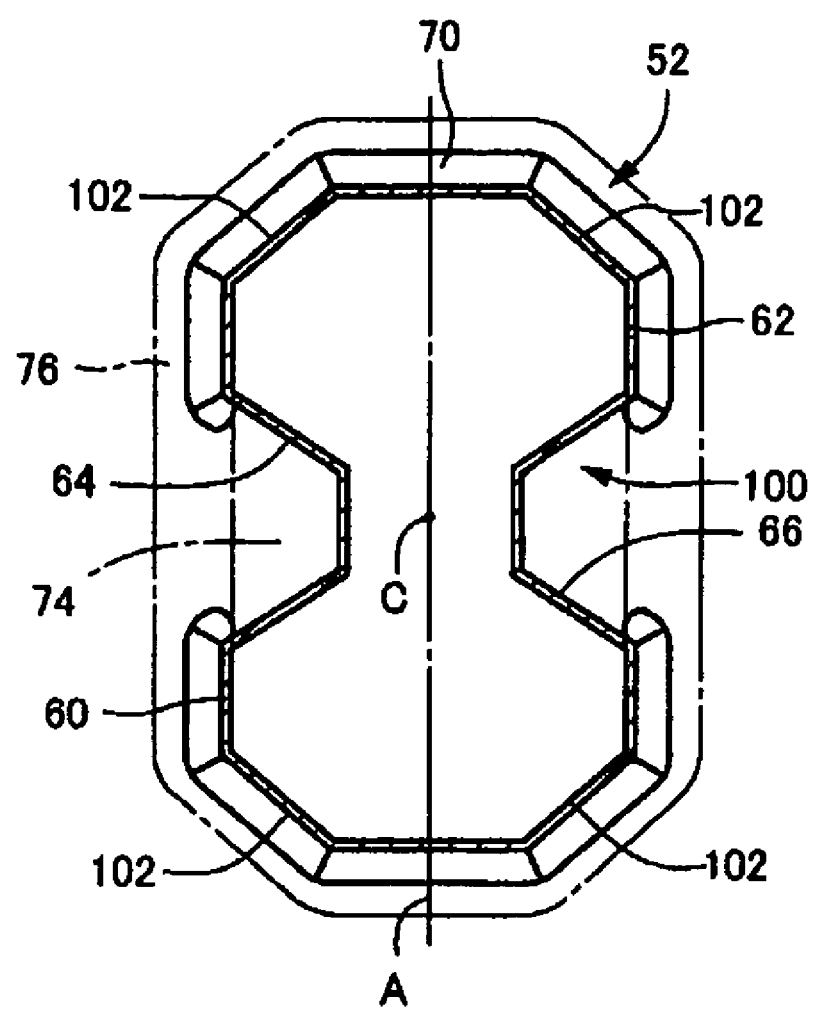
FIG. 2 is a sectional view of the main body of embodiment shown in FIG. 1 perpendicular to the axis thereof, and also shows a positional relation between the main body and the swell portion of the attaching plate.
Figure 3:
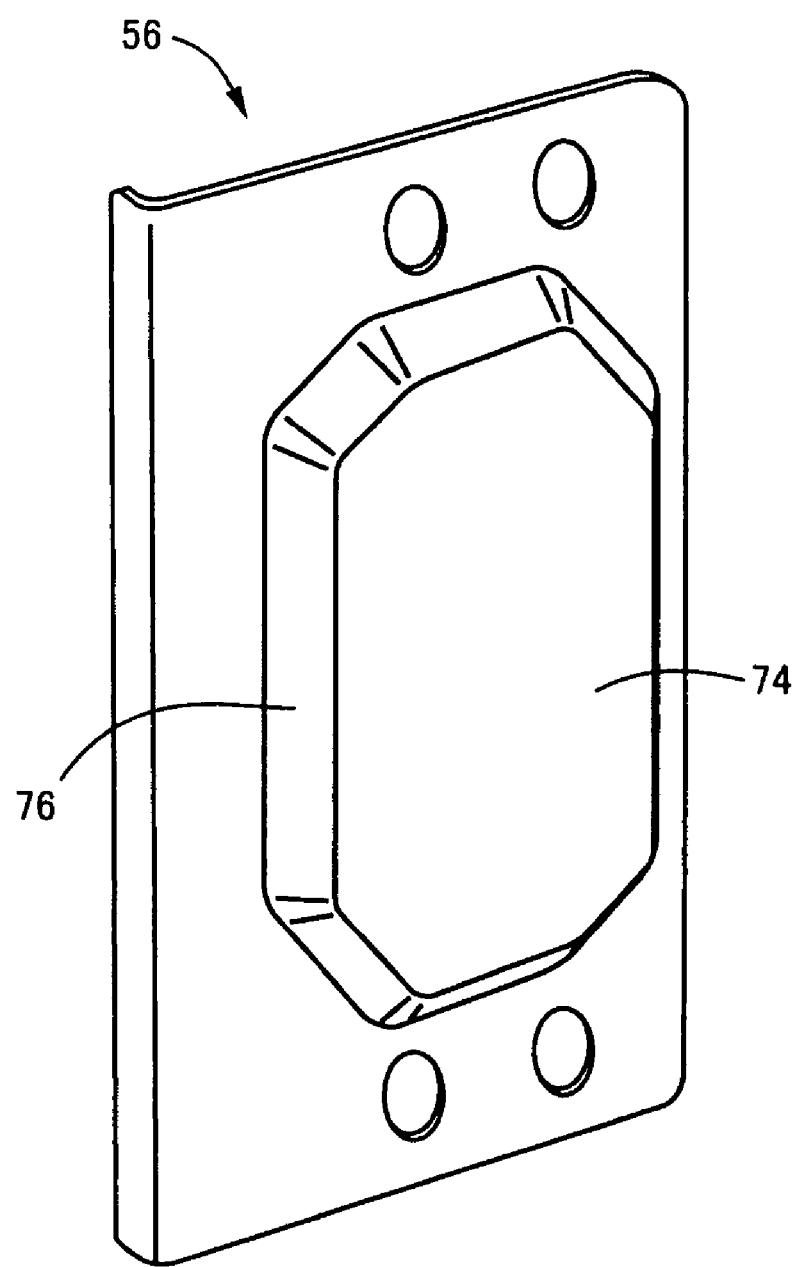
FIG. 3 is a perspective view showing one attaching plate in the embodiment shown in FIG. 1.

FIG. 1A is a perspective view of the main body 52, and FIG. 1B is a sectional view taken along a line 1B-1B in FIG. 1A, that is the sectional view showing a fixedly welded portion between the main body 52 and the attaching plate 56. FIG. 2 is a sectional view in which the main body 52 is cut at an axially intermediate portion thereof perpendicular to the axis thereof and views the attaching plate 56. FIG. 3 is a perspective view of the attaching plate 56 viewed from a side where the main body 52 is attached thereto.

The main body 52 of a predetermined shape is molded by subjecting for example a hollow cylindrical pipe member (carbon steel tube) to a hydraulic forming. In this embodiment, as apparent from FIG. 2, a basic shape defined by a section perpendicular to the axis of the hollow polygonal shape 100 has a flat octagonal shape (a shape in which four corners 102 of a rectangle are chamfered). Also, on a pair of side walls 60, 62 constructing two long sides (right-and-left sides in FIG. 2) substantially parallel to a direction of a long axis A, that is the direction of a plane including the axis C (up-and-down direction in FIG. 2) of the sectional view, at an axially intermediate portion, a pair of concave grooves 64, 66 are formed to be concaved inwardly of the hollow polygonal shape 100 symmetrical with respect to the axis. As a result, the main body 52 has as a whole a sectional shape of FIG. "8" or gourd.

In the hydraulic forming, a hydraulic pressure is applied to an inside of the pipe member for example to plastically deform it outwardly. Thus, the pipe member is fitted to a female mold to be deformed into the predetermined sectional shape. Here, a compressive force or a tensile force is axially applied to the main body upon the hydraulic forming, if needed. The main body 52 thus molded has thickness of about 1.2 mm which is thinner than 1.4 mm. Formation of the concave grooves 64, 66 over a full length of the main body 52 in the axial direction increases rigidity thereof, so that desired impact energy absorbing ability can be obtained and the weight is lightened, with the thin thickness of 1.2 mm. Here, the up-and-down direction in FIG. 2 corresponds to an up-and-down direction in a state where the main body 52 is mounted onto the vehicle.

At both axial end of the main body 52, flanges 68, 70 each protruding axially are provided integrally therewith. Hereinafter, the flange 70 protruding at the side of the attaching plate 56 will be explained in detail. As apparent from FIG. 2, the flange 70 is provided around the main body 52 except areas corresponding to the concave grooves 64, 66. Also, as shown in FIG. 1B, relative to the direction of axis of the main body 52 (up-and-down direction in FIG. 1B), the flange 70 protrudes outwardly of the hollow polygonal shape 100 to make an incline angle α ranging from zero to sixty degrees ($0° \leq \alpha < 60°$). FIG. 1 and FIG. 2 show the case where the incline angle α has a positive value, and the flange 70 in inclined outwardly from the hollow polygonal shape 100.

On the other hand, the attaching plate 56 is provided with a swell portion 74 at a predetermined position. That is, the swell portion 74 is formed by subjecting a part of the attaching plate 56 to be positioned inside of the hollow polygonal shape 100 of the main body 52 to the drawing. More specifically, the part of the attaching plate 56 to be positioned inside of the flat octagonal shape which is the basic sectional shape of the main body 52 is swelled by the drawing toward the main body 52 to form the swell portion. The swell portion 74 has a protruded flat surface of a trapezoidal shape, and an incline angle α of the outer peripheral wall 76 is selected to be $0° \leq \alpha < 60°$, so that the outer peripheral wall 76 is parallel to the above-mentioned flange 70. As a result, the flange 70 is surface contacted with the outer peripheral wall 76.

With the flange 70 being surface contacted with the outer peripheral wall 76 of the swell portion 74, the fillet-welding 78 is performed by the arc-welding along the top periphery of the flange 70, thereby being fixedly welded to the attaching plate 56 integrally. Here, the outer peripheral wall 76 functions as the claimed adhered supporting portion.

Incidentally, other flange 68 is constructed in the same manner as the flange 70. That is, the flange 68 protrudes outwardly from the hollow polygonal shape 100 relative to the axial direction of the main body 52 to make the incline angle α to be $0° \leq \alpha < 60°$. An attaching plate 54 is provided with a swell portion which has the same structure as the swell portion 74. With the flange 68 being surface contacted with an outer peripheral wall (adhered supporting portion) of the swell portion, the fillet-welding is performed by the arc-welding along a top periphery thereof. Thus, the flange 68 is fixedly welded to the swell portion 74 of the attaching plate 54 integrally.

In the crush box 50 thus constructed, the main body 52 of hollow polygonal shape 100 is provided with the flanges 68, 70 respectively formed at both axial ends of the main body 52 to protrude axially. These flanges 68, 70 are surface contacted with the outer peripheral walls 76 of the swell portions 74 respectively formed on the attaching plates 54, 56.

Figure 7A:
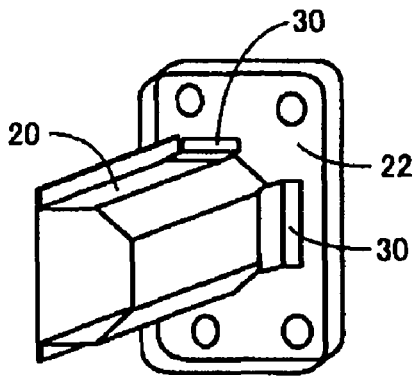
FIG. 7 is a set of views explaining three kinds of modes for fixedly welding the main body of the impact absorbing member for vehicle in FIG. 6 to the attaching member.
Figure 7A:
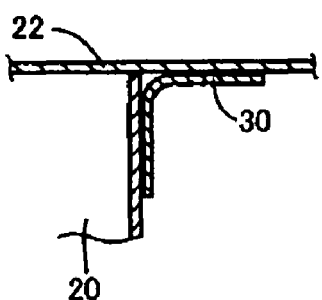
Figure 7B:
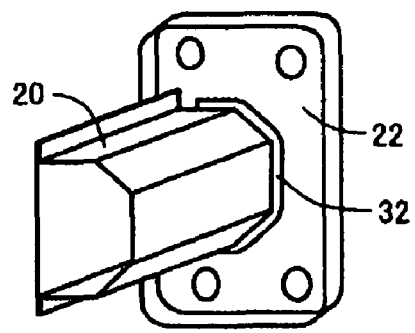
Figure 7B:
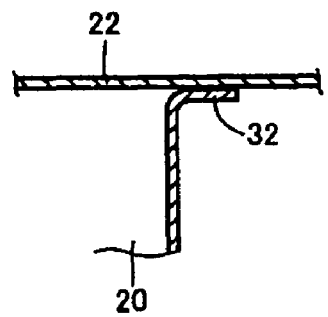
Figure 7C:
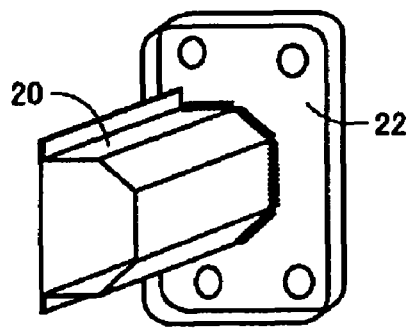
Figure 7C:
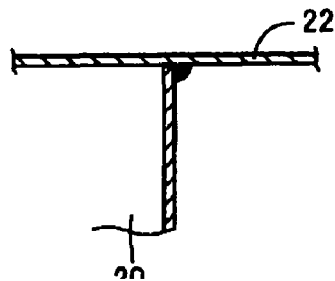

As a result, compared with the case shown in FIG. 7C in which the axial end of the main body 20 is butted to the attaching plate 22 at the right angle to be welded, the flanges 68, 70 can be suitably arc-welded to the attaching plates 54, 56 even when thickness of the main body 52 is thin. In addition, due to unnecessity or omission of the bracket, the crush box 54 rendering the desired impact energy absorbing ability can be obtained in light-weight and in low-price.

Since the main body 52 of thin thickness can be fixedly welded to the attaching plates 54, 56 suitably, by contriving the sectional shape thereof as shown in FIG. 2, thickness can be made thinner than 1.4 mm with maintaining the desired impact energy absorbing ability. In this way, weight of the main body 52 is further lightened.

In addition, when thickness of the main body 52 is made thin for the purpose of absorbing impact energy under the low load, for example to decrease damage of the vehicle upon impact in the low speed, thickness of the main body 52 can be made thinner below 1.4 mm. In this way, the main body 52 crushes even with the low load to render the impact energy absorbing operation.

In this embodiment, the inclined angle α of the flanges 68, 70 protruding outwardly from the hollow polygonal shape 100 relative to the axial direction of the main body 52 is selected to be $0° \leq \alpha < 60°$. Accordingly, the desired impact energy absorbing ability can be obtained stably, different from the case shown in FIG. 7B in which the flange bent at the right angle is fixedly welded to the attaching plate and which suffers from the drawback of the main body being bend upon inputting of the load thereto.

By the fillet-welding 78 performed along the top periphery of the flanges 68, 70, the flanges 68, 70 are easily fixedly welded to the outer peripheral wall 76 of the swell portion 74 integrally. Accordingly, the fixedly welding can be performed by the arc-welding from outside of the main body 52 easily, different from the case where the overlapped portion between the flanges 68, 70 and the outer peripheral wall 76 is fixedly welded by the spot-welding.

The part of each attaching plate 54, 56 to be positioned inside of the hollow polygonal shape 100 of the main body 52 is swelled toward the main body 52 by the drawing, so that the outer peripheral wall 76 of the swell portion 74 forms the adhered supporting portion to which the flanges 68, 70 are fixedly welded. For this reason, compared with the case where the part of each attaching plate 54, 56 is cut and bent-up to form the adhered supporting portion, the supporting portion of high rigidity can render the excellent supporting strength.

Figure 4A:
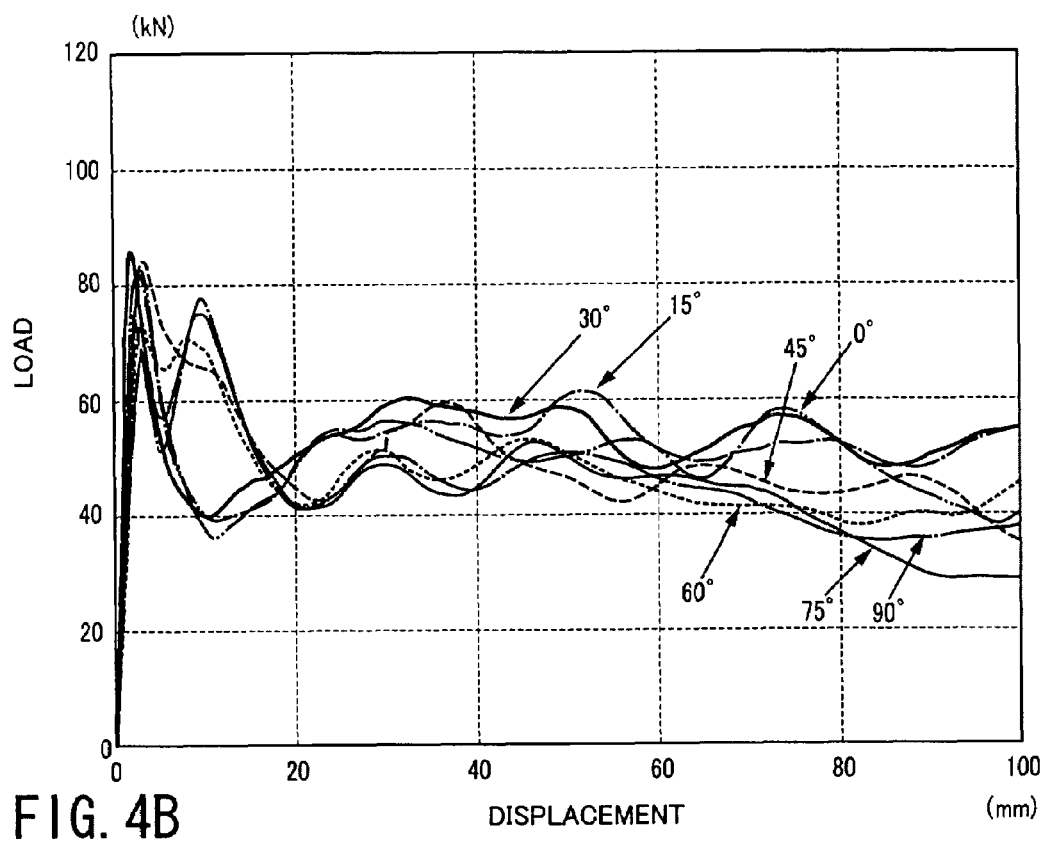
FIG. 4A shows a relation between the load and the displacement amount.

Here, seven kinds of test pieces of crush boxes 50 each having different incline angles α of 0°, 15°, 30°, 45°, 60°, 75° and 90° are prepared. The compressive load is applied to these crush boxes 50 in a direction parallel to the axis thereof to examine the impact energy absorbing ability by a finite element method (dynamic analysis). Thus, a test result shown in FIG. 4 was obtained. FIG. 4A is a graph showing a relation between the load and the displacement, and FIG. 4B is a graph showing a relation between EA (energy absorption) amount corresponding to an integrated value of the load shown in FIG. 4A and the displacement.

In the both graphs, a long dashed double-short dashed line shows the case of the incline angle of α=0°, a long dashed and short dashed line with narrow pitch shows the case of α=15°, a thick continuous line shows the case of α=30°, a dashed line shows the case of α=45°, a dotted line with smaller pitch than the dashed line shows the case of α=60°. A thin continuous line shows the case of α=75°, and a long dashed and short dashed line with wide pitch shows the case of α=90°. Here, the main body 52 has the thickness of 1.2 mm, the axial length of 150 mm, the up-and-down dimension in FIG. 2 being 100 mm, and the right-and-left dimension in FIG. 2 being 60 mm, respectively.

Figure 4B:
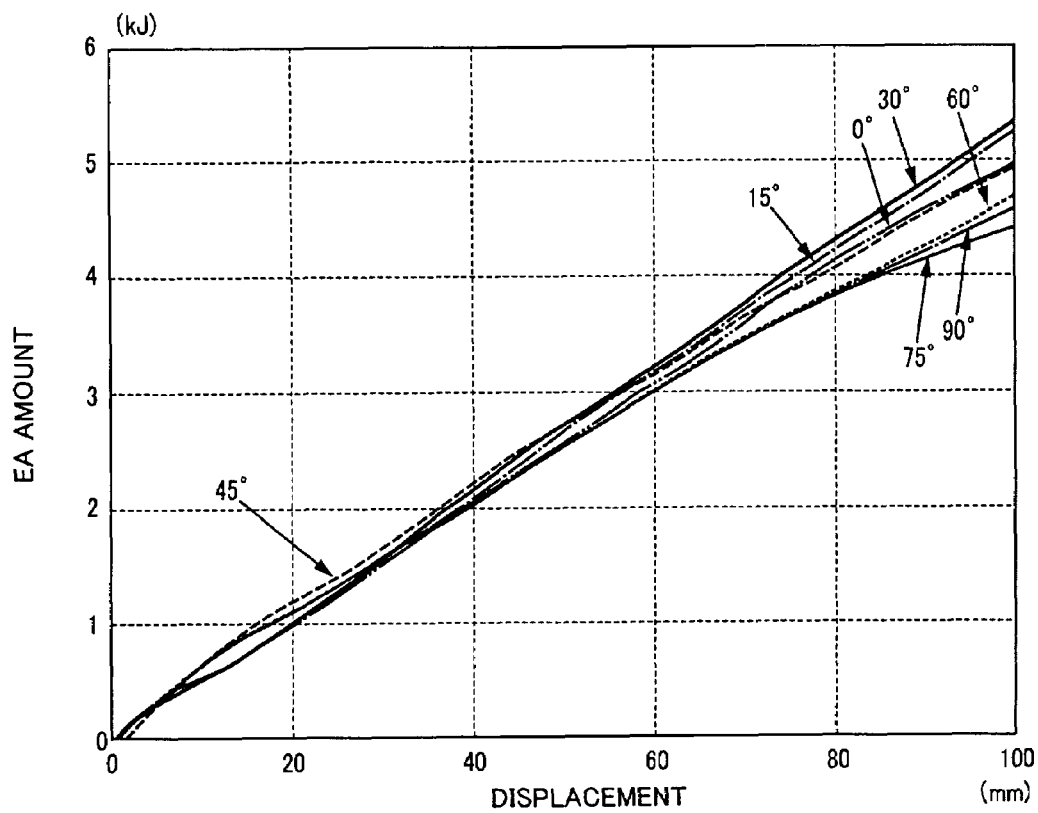
FIG. 4B shows a relation between the EA (energy absorption) amount and the displacement amount.

As apparent from FIGS. 4A and 4B, in the cases of α=60° to 90°, as compared with other cases, the energy absorbing amount decreases in the displacement amount larger than 70 mm. This appears to be resulted from the unstable deforming behavior of the crush box 50. That is, the crush boxes 50 are not subjected to a suitable axial crush mode where the buckle into the bellows shape is repeated sequentially by a short cycle from the load inputting direction. The crush boxes 50 began to crush from the opposite side (rear end of the vehicle) and is simultaneously subject to the buckle at plural points spaced in the longitudinal direction. As a result of such the unstable crushing, the crush box 50 tends to crush with the load of reduced magnitude, and extremely tends to yield with the load inputted from an inclined direction.

Through the above tested result, it is confirmed that the stable energy absorbing ability can be obtained by formation of the flanges 68, 70 in the incline angle range of 0°≦α<60°. Also confirmed is, in the cases of the incline angle of α=0° and α=45°, the energy absorbing amount slightly decreases, when the displacement amount exceeds 80 mm. Judging from the above fact, the range of the incline angle of 5°≦α≦40° is considered preferable, and the range of 15°≦α≦30° is considered more preferable.

Figure 5A:
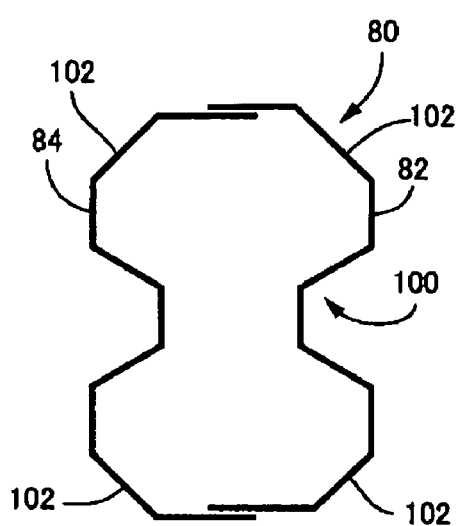
FIG. 5 is a set of views showing another embodiments in which a structure and a sectional view of the main body are modified.

For obtaining the main body 52 of this embodiment, the pipe member of the hollow polygonal shape 100 is formed into the figure "8" shape or the gourd shape in the sectional view thereof. However, as shown in FIG. 5A, a main body 80 of hollow polygonal shape 100 can be constructed by a pair of half pieces 82, 84. That is, each of the paired half pieces 82, 84 is prepared by the pressing a pair of sheet plate each having the sectional shape of figure "3", and such sectional view corresponds a shape obtained by dividing the main body 52 by a vertical plane substantially parallel to the axis thereof. The both half pieces are disposed so that open sides are faced to each other, and end portions overlapped with each other in the up-and-down direction in FIG. 5A are fixedly welded integrally. Thus, the main body of hollow polygonal shape 100 can be constructed by the paired half pieces.

Figure 5B:
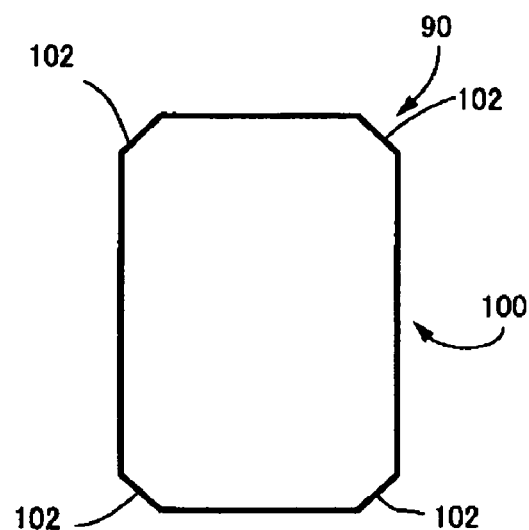

As shown in FIG. 5B, a main body 90 having simple rectangle sectional view (in FIG. 5B, four corners 102 are chamfered) can be adopted. Noted is that in FIGS. 5A and 5B which are the sectional view perpendicular to the axis of the hollow polygonal shape 100 and each of which corresponds to FIG. 2, thickness is shown by the thick continuous line, and the flange provided at the axial ends are omitted for simplification.

Heretofore, the embodiment of the present invention was explained based on the drawings. However, noted is that the above mentioned embodiment is only one example. The present invention can be also carried out in the modes which are modified or improved according to knowledge of the skilled person.

What is claimed is:

1. An impact absorbing member for a vehicle, comprising:
   a main body constructed of a single tubular member having a hollow polygonal shape, and axial ends to which a pair of attaching plates are fixedly welded, respectively;
   the main body having at least at one axial end thereof, a flange protruding at least axially and being integrally formed with the main body;
   at least one of the attaching plates having a swelled portion providing an adhered supporting portion formed in parallel with the flange and in surface contact therewith, the swelled portion being configured such that a whole surface thereof positioned inside of the hollow polygonal shape protrudes toward the inside of the main body and the swelled portion has a flat trapezoidal shape in a section so that an outer peripheral wall of the swelled portion forms the adhered supporting portion; and
   the flange of the main body being fixedly welded to the adhered supporting portion of at least one of the attaching plates in surface contact with the adhered supporting portion.

2. An impact absorbing member for a vehicle according to claim 1, the flange protruding outwardly of the main body.

3. An impact absorbing member for a vehicle according to claim 2, wherein the flange protrudes outwardly from the hollow polygonal shape of the main body relative to the axis thereof to define an inclined angle α below sixty degrees (<60°).

4. An impact absorbing member for a vehicle according to claim 3, wherein the inclined angle of the flange is preferably 5°≦α<40°, and more preferably 15°≦α<30°.

5. An impact absorbing member for a vehicle according to claim 1, wherein the flange is fixed to the adhered supporting portion integrally by a fillet-weld along a top periphery of the flange.

6. An impact absorbing member for a vehicle according to claim 5, wherein the fillet weld is an arc-weld.

7. An impact absorbing member for a vehicle according to claim 1, wherein the main body has a polygonal shape having more than six sides in a sectional shape perpendicular to the axis thereof.

8. An impact absorbing member for a vehicle according to claim 7, wherein the main body is constructed of a pair of half pieces substantially symmetrical with respect to a plane including the axis.

9. An impact absorbing member for a vehicle according to claim 7, wherein the main body has a thickness less than 1.4 mm.

10. An impact absorbing member for a vehicle according to claim 7, wherein the flange is provided on an entire periphery or at least a cornered portion, of the main body.

11. An impact absorbing member for a vehicle according to claim 10, wherein on two faced sides of the main body a pair of concave grooves concaved inwardly are formed, and the flange is provided at an area except for the concave grooves.

12. An impact absorbing member for a vehicle according to claim 1, wherein the adhered supporting portion has a polygonal shape corresponding to the polygonal shape of the flange.

* * * * *

UNITED STATES PATENT AND TRADEMARK OFFICE
CERTIFICATE OF CORRECTION

| | | |
|---|---|---|
| PATENT NO. | : 7,862,104 B2 | Page 1 of 1 |
| APPLICATION NO. | : 11/503996 | |
| DATED | : January 4, 2011 | |
| INVENTOR(S) | : Mitsutoshi Kano et al. | |

It is certified that error appears in the above-identified patent and that said Letters Patent is hereby corrected as shown below:

Title Page, in the Title, item (54), "IMPACK ABSORBING MEMBER FOR VEHICLE" should read
-- IMPACT ABSORBING MEMBER FOR VEHICLE --.

Signed and Sealed this

Twenty-sixth Day of April, 2011

David J. Kappos
*Director of the United States Patent and Trademark Office*

UNITED STATES PATENT AND TRADEMARK OFFICE
CERTIFICATE OF CORRECTION

PATENT NO. : 7,862,104 B2
APPLICATION NO. : 11/503996
DATED : January 4, 2011
INVENTOR(S) : Mitsutoshi Kano et al.

It is certified that error appears in the above-identified patent and that said Letters Patent is hereby corrected as shown below:

Title Page, Item (54) and at Column 1, lines 1 and 2, in the Title, "IMPACK ABSORBING MEMBER FOR VEHICLE" should read -- IMPACT ABSORBING MEMBER FOR VEHICLE --.

This certificate supersedes the Certificate of Correction issued April 26, 2011.

Signed and Sealed this
Twenty-fourth Day of May, 2011

David J. Kappos
*Director of the United States Patent and Trademark Office*